United States Patent

[11] 3,609,680

| [72] | Inventor | Juan Belart<br>Walldorf, Germany |
|---|---|---|
| [21] | Appl. No. | 726,359 |
| [22] | Filed | May 3, 1968 |
| [45] | Patented | Sept. 28, 1971 |
| [73] | Assignee | Alfred Teves GmbH<br>Frankfurt/Main, Germany |
| [32] | Priority | May 5, 1967 |
| [33] | | Germany |
| [31] | | T 33798 II/63c |

[54] BRAKE FLUID RESERVOIR
8 Claims, 3 Drawing Figs.

[52] U.S. Cl. ..................................................... 340/59,
340/244 E
[51] Int. Cl. ............................................. B60t 17/22
[50] Field of Search .......................................... 340/59, 244
A, 244 E; 200/84

[56] References Cited
UNITED STATES PATENTS

| 2,894,093 | 7/1959 | Frey .............................. | 340/59 |
| 2,907,844 | 10/1959 | Lindsey ........................ | 340/59 |
| 3,118,304 | 1/1964 | Fuhs ............................. | 340/244 E |
| 3,479,639 | 11/1969 | Randol ........................ | 340/59 |

Primary Examiner—John W. Caldwell
Assistant Examiner—Howard S. Cohen
Attorney—Karl F. Ross ABSTRACT: A brake fluid reservoir with an alarm switch for signaling an insufficient fluid level in its interior. The mechanism is mounted in an insert in one neck of a filler opening of the reservoir, the connections between the alarm and the switch mechanism being led laterally out through a projection of the insert passing through the side of the neck; the insert is provided with a hole through which brake fluid can be poured.

JUAN BELART
*INVENTOR.*

BY
Karl F. Ross
ATTORNEY

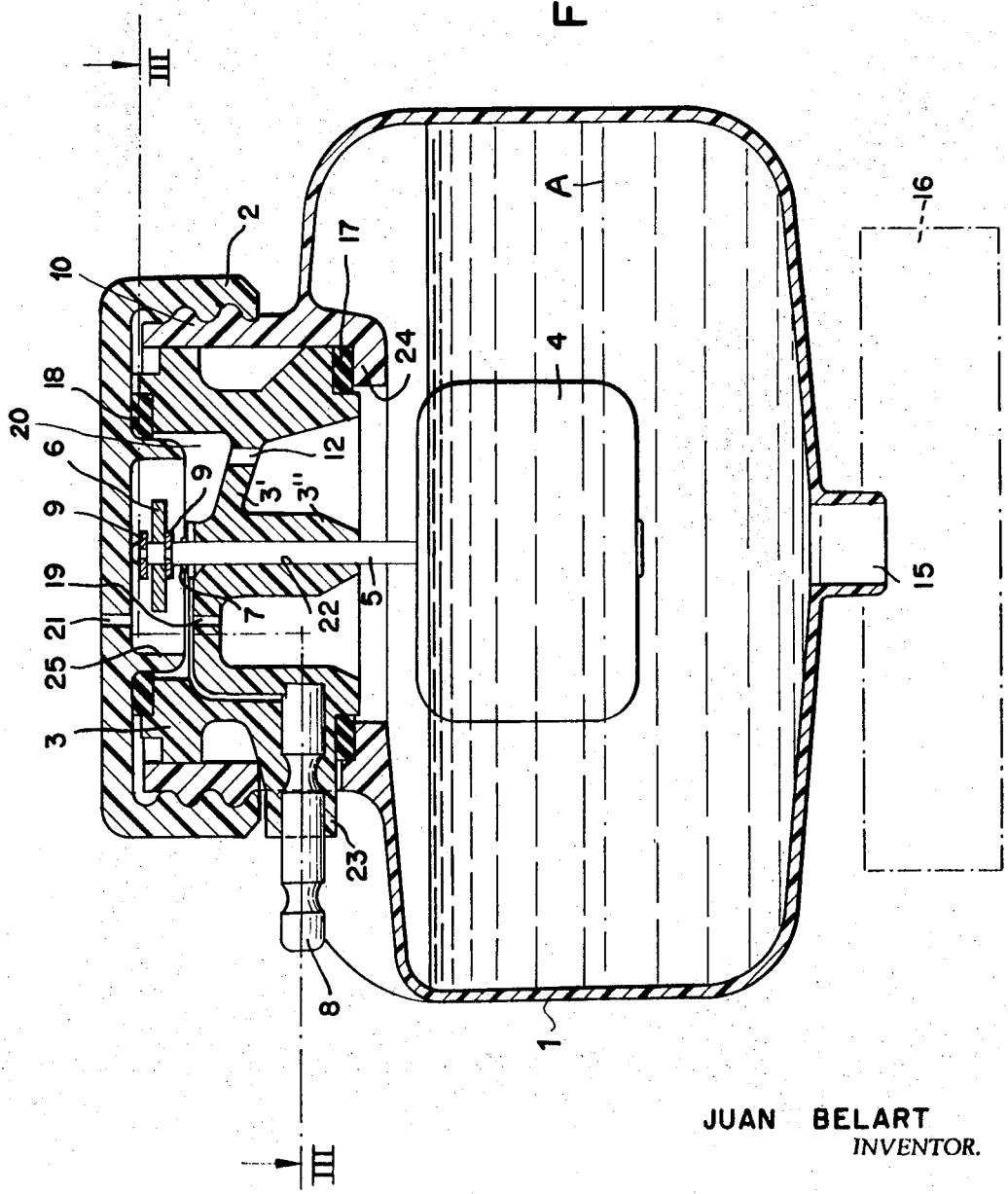

BRAKE FLUID RESERVOIR

My invention relates to a brake fluid reservoir having an alarm for signaling an insufficient brake fluid level in the reservoir for a vehicular brake system by means of an electrical switch arrangement connected to the alarm and actuatable by a float in the reservoir.

Such reservoirs are known in the art; however, they often give rise to certain difficulties. The main difficulty is caused by the fact that the switch mechanism for the alarm is usually built partly or entirely into the cap of the filler opening. At the very least, the wires for the alarm pass through the cap. Thus, in order to replenish the fluid in the reservoir, one must dismantle the switch mechanism to some extent. In addition, such a structure requires the reservoir to be relatively high, an undesirable arrangement in today's compactly built cars.

It is an object of my invention to overcome these difficulties.

In accordance with the present invention, a brake fluid reservoir is provided with an alarm switch mechanism mounted in an insert in an upstanding neck of a filler opening of the reservoir, the connections between the alarm and the switch mechanism being led laterally or radially out through the side of the neck below the cap, and the insert being provided with a hole through which the brake fluid can be poured when refilling the reservoir. In addition, such a reservoir using an insert as above described permits the switch mechanism of the alarm to be fitted into a minimal space in the brake fluid reservoir, thereby making a very compact reservoir possible.

The above and other objects, features and advantages of the present invention are described in greater detail below with reference to the accompanying drawing in which:

FIG. 2 is a vertical section taken along line II—II of FIG. 1; and

Figure 1:
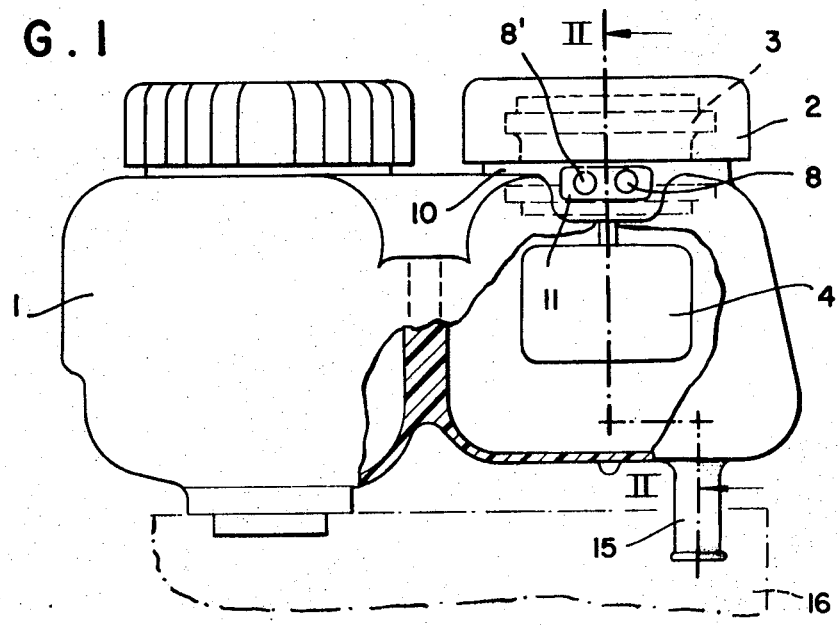
FIG. 1 is an elevational view of a two-chamber brake fluid reservoir embodying the invention, the reservoir being partly broken away.

The drawing shows a brake fluid reservoir 1 having an externally threaded filler-opening neck 10 fitted with a complementarily threaded filler-opening cap 2 having an air vent hole 21. The fluid chamber (containing the switch mechanism according to the invention) of the reservoir 1 communicates via a port 15 with a compartment of a master cylinder 16 shown by dot-dash lines in FIG. 1.

The filler-opening neck 10 receives an insert 3 whose peripheral annular wall is sealed around its bottom against a ledge 24 of the reservoir 1 by a gasket 17 and around its top against a circular rib 25 of the cap 2 by a second gasket 18.

Figure 3:
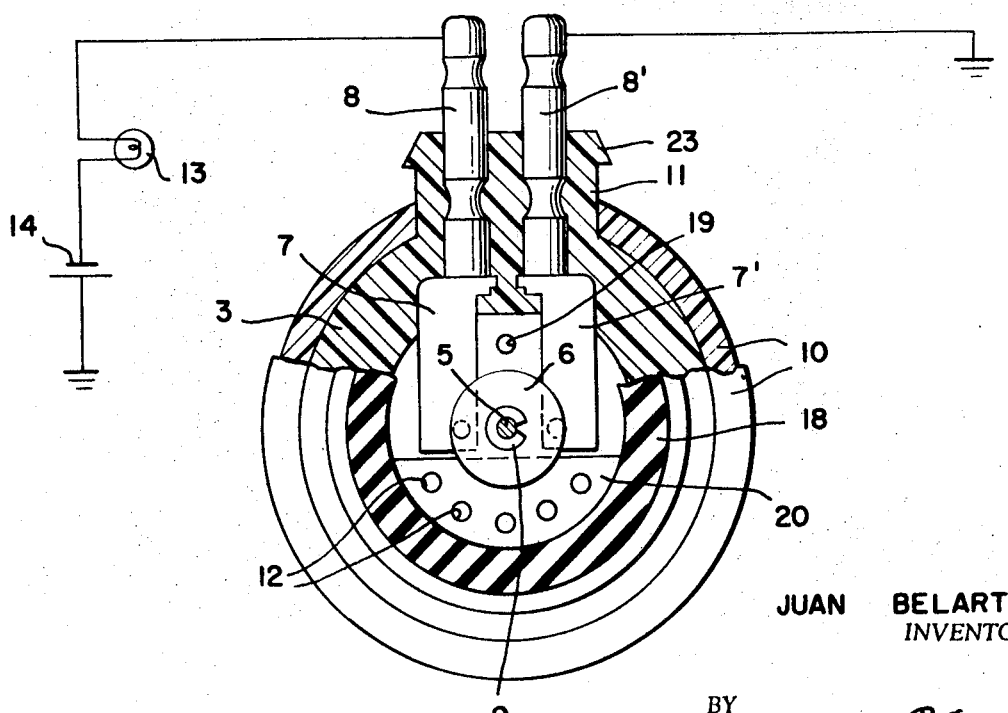
FIG. 3 is a section taken along line III—III of FIG. 2.

A float 4 in the interior of the reservoir 1 is mounted on a vertical guide pin 5, passing slidably through a vertical bore 22 in the central axial boss 3'' of insert 3 and preferably of an insulating material, which carries a conductive disk 6 between two snap rings 9 on its upper end above the bore 22. The disk 6 can be brought into engagement with two contacts 7, 7' which are electrically connected by plugs 8, 8' to an alarm such as a lamp 13 connected to a power source such as the vehicle battery 14 and a ground (FIG. 3). The plugs 8, 8' are annularly grooved and are embedded in a protruding portion 23 of the molded synthetic resin or rubber insert 3 which passes laterally out of the reservoir 1 through a passage 11 in the neck 10 as best seen in FIGS. 2 and 3.

Holes 12 pass vertically through the insert 3 at the bottom of a funnel-shaped space 20 therein to permit brake fluid to flow therethrough and into the interior of the reservoir 1 while displaced air can pass out through another opening 19 located at a higher point in the central web portion of the insert 3.

Under the normal "full" condition of the brake fluid reservoir 1 as shown in FIG. 2, the float 4 is buoyed up to the point where its disk 6 is not in contact with the contacts 7, 7'', and the upper end of its guide pin 5 abuts the cap 2, thereby limiting movement of the pin 5 and permitting only minimal wear. In this condition no circuit is completed between the contacts 7, 7' so that the lamp 13, here representing the alarm for the driver, is not lit.

Should the brake fluid sink to a predetermined low level such as the one shown by dot-dash line A in FIG. 2, the float 4 drops accordingly and thereby brings the disk 6 into contact with contacts 7, 7' closing the circuit for and lighting the lamp 13 to signal to the driver the phenomenon of insufficient brake fluid in the reservoir 1.

In order to refill or replenish the reservoir 1, one need only remove the cap 2 by unscrewing it and pour brake fluid into the funnellike opening 20. It will easily pass through the holes 12, the air displaced by the fluid passing easily out through the opening 19 in the other side of the insert.

In case removal of the switch mechanism with its float is necessary, one need merely disconnect the connections to the plugs 8, 8' and pull out the whole insert 3 with float attached. Making the insert from a synthetic resin gives it the necessary pliability to make its installation and removal quite simple.

For the sake of illustration, my improved switch mechanism is shown mounted in a two-chamber brake fluid reservoir. However, it is obvious that it lends itself just as well to use in a brake fluid reservoir having only a single chamber.

The invention described and illustrated is believed to admit of many modifications within the ability of persons skilled in the art, all such modifications being considered within the spirit and scope of the appended claims.

I claim:

1. A brake fluid reservoir for a vehicular brake system having a master cylinder and an alarm device for indicating a brake fluid level in said reservoir, said reservoir comprising:
   a housing forming a chamber connectable with said master cylinder and having a top wall provided with a tubular neck forming filler opening communicating with said chamber;
   an insert received in said neck and provided with at least one bore opening into said chamber;
   a removable cap adapted to cover said filler opening, said neck and said cap being provided with interlocking formations effective upon rotation of said cap to enable said cap to be removed from said neck while said insert remains in place therein, said housing being provided with a lateral passage in said neck below said cap; and
   switch means in said chamber movably mounted on said neck and responsive to said brake fluid level while being connectable through said lateral passage to said alarm device for operating same.

2. A reservoir as defined in claim 1 wherein said neck is generally upright and said insert has a body formed with a substantially cylindrical peripheral wall generally coextensive with said neck, with a boss spaced inwardly from a portion of said peripheral wall, and with a web connecting said boss to said peripheral wall.

3. A reservoir as defined in claim 2 wherein said housing includes an annular ledge within and near the bottom of said neck, a circular rib on said cap extending downwardly toward said insert, a first annular gasket between said peripheral wall and said cap surrounding said circular rib, and a second annular gasket between said peripheral wall and said ledge.

4. A reservoir as defined in claim 2 wherein a first portion of said web is higher than a second portion of said web, said second portion of said web being formed with said bore in the form of a throughgoing hole opening into said chamber for filling same with brake fluid.

5. A reservoir as defined in claim 2 wherein said boss is provided with a vertical second bore, said switch means comprising a pin slidably mounted in said vertical second bore, and actuating float on the lower end of said pin, a conducting member on the upper end of said pin, and at least one contact member engageable with said conducting member.

6. A reservoir as defined in claim 5 wherein said cap defines an upper limit of travel of said pin and said insert defines a lower limit of travel thereof.

7. A reservoir as defined in claim 5 wherein said insert further includes a lateral projection fitting said lateral passage, said switch means including at least one lead connected to said alarm device and passing through said lateral projection.

8. A reservoir as defined in claim 7 wherein said lead comprises a plug embedded in said lateral projection, a conductor connecting said pin to said contact, said pin extending outwardly from said neck; said switch means comprising snap rings engaging said pin for holding said conducting element on said pin; said peripheral wall, said web, defining a compartment in said neck open upwardly upon removal of said cap, said compartment communicating with said chamber through said throughgoing hole and containing said contact and said conducting element.